United States Patent
Roovers et al.

(10) Patent No.: US 7,764,799 B2
(45) Date of Patent: Jul. 27, 2010

(54) AUDIO SYSTEM PROVIDING FOR FILTER COEFFICIENT COPYING

(75) Inventors: David Antoine Christian Marie Roovers, Eindhoven (NL); Bahaa Eddine Sarroukh, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1054 days.

(21) Appl. No.: 10/596,762

(22) PCT Filed: Dec. 20, 2004

(86) PCT No.: PCT/IB2004/052855

§ 371 (c)(1), (2), (4) Date: Jun. 23, 2006

(87) PCT Pub. No.: WO2005/076662

PCT Pub. Date: Aug. 18, 2005

(65) Prior Publication Data

US 2009/0003615 A1    Jan. 1, 2009

(30) Foreign Application Priority Data

Jan. 7, 2004    (EP) .................... 04100022

(51) Int. Cl.
*H04B 3/20* (2006.01)

(52) U.S. Cl. ....................................... 381/66

(58) Field of Classification Search ............ 381/66, 381/71.4, 71.11, 83, 93; 379/406.01–406.16
See application file for complete search history.

(56) References Cited

U.S. PATENT DOCUMENTS

| | | | |
|---|---|---|---|
| 6,760,450 B2 * | 7/2004 | Matsuo | 381/92 |
| 6,760,451 B1 * | 7/2004 | Craven et al. | 381/98 |
| 7,003,099 B1 * | 2/2006 | Zhang et al. | 379/406.03 |
| 7,035,415 B2 * | 4/2006 | Belt et al. | 381/92 |
| 7,035,416 B2 * | 4/2006 | Matsuo | 381/92 |
| 7,054,451 B2 * | 5/2006 | Janse et al. | 381/83 |

* cited by examiner

*Primary Examiner*—Curtis Kuntz
*Assistant Examiner*—Hai Phan

(57) ABSTRACT

A system (1) is described which is suited for suppressing audio distortion. The system comprises echo cancelling means ($g_1$, $g_2$) coupled between an audio output (4) and a distorted desired audio sensing microphone array (3), and a filter arrangement (7) coupled to the echo cancelling means ($g_1$, $g_2$) and/or the microphone array (3). The filter arrangement (7) includes filter coefficients representing at least a part of the audio distortion, such as reverberation. The system also comprises an at least partly mirrored circuit arrangement (g', 7') for copying thereby simulated audio distortion representative filter coefficient values into the filter coefficients of said filter arrangement (7). Such copied values can be then used for suppressing reverberation in a distorted desired signal by the filter arrangement (7).

8 Claims, 2 Drawing Sheets

AUDIO SYSTEM PROVIDING FOR FILTER COEFFICIENT COPYING

The present invention relates to a system for suppressing audio distortion, comprising a circuit arrangement of:
echo cancelling means coupled between an audio output and a distorted desired audio sensing microphone array, and
a filter arrangement coupled to the echo cancelling means and/or the microphone array.

The present invention also relates to a mirrored circuit arrangement for application in the system and to a method of suppressing audio distortion.

Such a system is known from WO 97/45995. The known audio system comprises an adaptive echo cancelling filter for removing echoes emanating between a systems' loudspeaker output and a microphone. The known system has a filter arrangement coupled to the echo cancelling filter and the microphone for spectrally suppressing echo components in the microphone signal that were not removed by the echo cancelling filter. One microphone senses a desired audio signal, while the other microphones only receive interfering distortions of the desired signal. The system may have a filter arrangement coupled to the echo cancelling means and/or the microphone array for spectrally suppressing distortion in the form of additional audio noise interference.

It is a disadvantage of the known system that it can not effectively be used for also reducing reverberant distortions in a desired audio signal sensed by a microphone array.

Therefore it is an object of the present invention to provide an improved system and filter arrangement therein for also suppressing echo distortion in the form of echo tail part reverberation in an audio signal sensed by a microphone array.

Thereto in the system according to the invention the filter arrangement includes filter coefficients representing at least a part of the audio distortion, and the system comprises an at least partly mirrored circuit arrangement for copying thereby simulated audio distortion representative filter coefficient values into the filter coefficients of said filter arrangement.

It is an advantage of the system and circuit arrangement according to the present invention that by copying simulated filter coefficients which are representative of the audio distortion into the filter coefficients of the filter arrangement the suppression of the audio distortion is made speech signal—in general desired signal—independent. The coefficient values represent the correlation properties of the reverberant tail part(s) of the sound field and can also be used for actually filtering the desired signal in filter arrangement for suppressing reverberation therein, irrespective whether desired speech is output or not. So in particular the presence or absence of speech no longer distorts the distortion cancellation. Even if speech is present distortion cancellation of the spatial correlation sensitive forms of distortion, in particular but not exclusively, reverberation types of distortion, can be effected efficiently by means of the system according to the present invention.

An embodiment of the system according to the invention allowing design flexibility is characterised in that the filter arrangement includes a beamformer.

Most often a combination of filter, sum and delay elements is comprised in the filter arrangement to form the so called Generalised Sidelobe Canceller. Advantageously an additional delay element may be added to the beamformers for further improving the performance of the system according to the invention.

Advantageously another simple embodiment of the system according to the invention is characterised in that the system comprises coefficient value copying means between the circuit arrangement and the at least partly mirrored circuit arrangement.

A further embodiment of the system according to the invention is characterised in that the filter arrangement is arranged to be adaptive to the reverberation distortion and/or the desired audio signal sensed by the microphone array.

In that case the filter coefficients can be updated, to include a dynamic aspect in the cancelling of varying correlation sensitive forms of distortion, such as for example reverberation, instead of representing a more or less fixed model of the room. Now such distortion can also be suppressed in relation to the respective varying positions and directions of the array microphones.

A still further embodiment of the system according to the invention is characterised in that the system is arranged for updating the mirrored filter coefficients.

Advantageously in this further embodiment the mirrored filter coefficients may be updated continuously, whenever necessary or during a training session. This is achieved because the mirrored filter coefficients are created by means of an artificial input signal representing reverberation.

An elaboration of the system according to the invention is characterised in that each microphone of the microphone array has its individual echo cancelling means.

By applying individualised echo cancelling means for each microphone of the array any separate direct echoes and reflections, and at least a part of the reverberating tail are cancelled individually as much as possible, while remaining distortion is dealt with by the filter arrangement and/or the output echo cancelling means.

At present the system according to the invention will be elucidated further together with its additional advantages, while reference is being made to the appended drawing, wherein similar components are being referred to by means of the same reference numerals. In the drawing.

Figure 1:
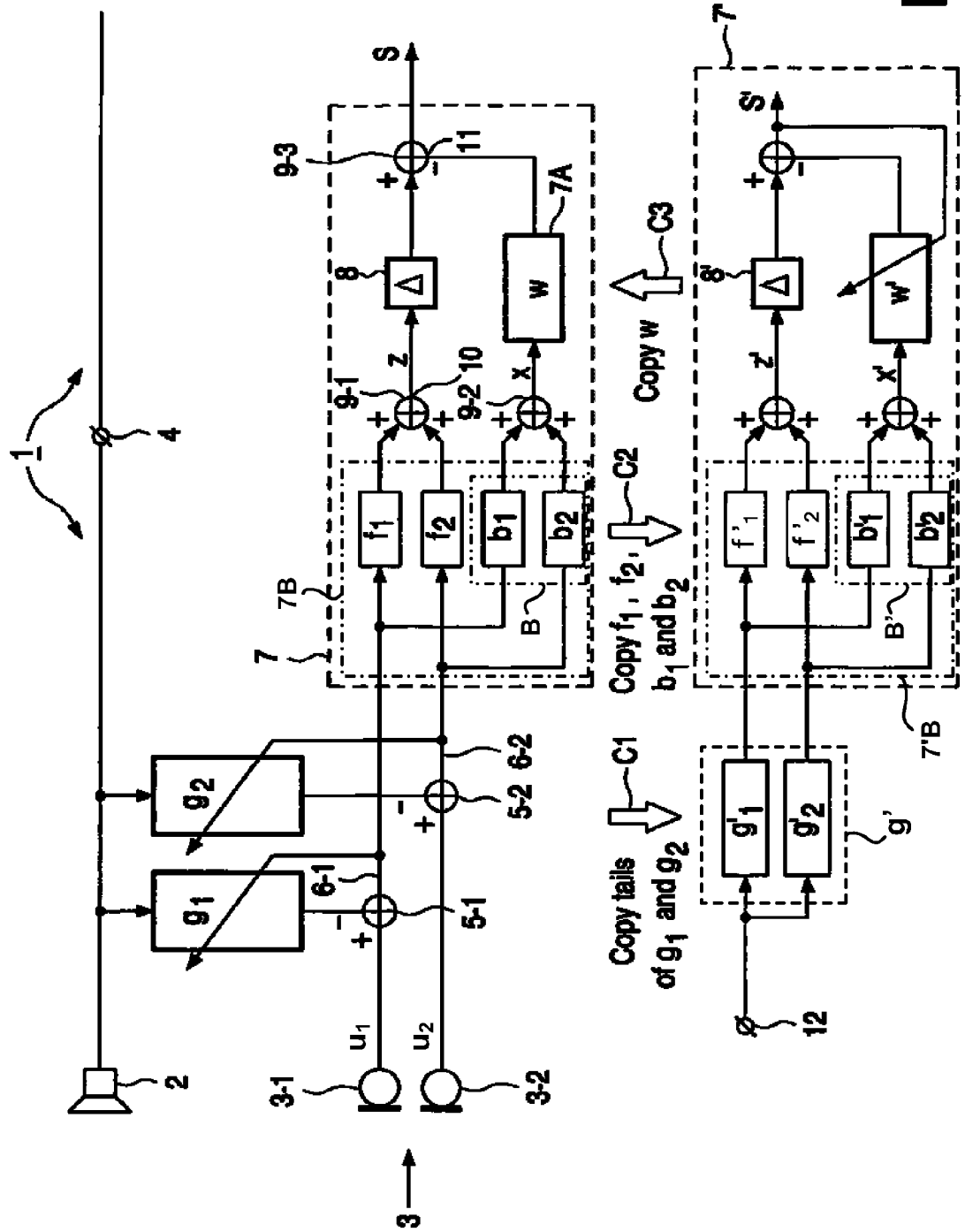
FIG. 1 shows a overview including possible embodiments of the system according to the invention.

The upper part of FIG. 1 shows a system 1, which is suited for suppressing audio distortion in a desired signal. The system as shown has a loudspeaker 2 and a microphone array 3 comprising two microphones 3-1, 3-2. An audio output signal on output 4 is reproduced by the loudspeaker 2. A near end source (not shown) generates desired speech, which is received by the array 3 as a desired speech signal. In addition the micropone array 3 senses (as clarified in connection with FIG. 2) as part of different kinds of distortions apart from noise, (i) a direct signal from the loudspeaker 2 to the array 3, (ii) echoes in the form of early (first part) reflections and (iii) after some exponential decay, later (second part) reflections in the form of so called reverberation shown as a reverberating tail of a typical room impulse response as a function of time. Each microphone 3-1, 3-2 may have its associated echo canceller $g_1$, and $g_2$ respectively coupled between the audio output 4 and the distorted desired audio sensing microphone array 3. If at all possible hardware and/or software parts of the echo cancelling means $g_i$ (i=1, 2 for two microphones) may be used in common in order to save costs. Each of the echo cancellers $g_i$ simulate the path from the loudspeaker 2 to a respective microphone 3 in order to cancel the effects of at least the direct signal and the early reflections, that is the first part of the echo. The technique accomplishing that is for example known from WO 97/45995, whose disclosure is incorporated herein by reference thereto. The respective echo cancelling means may be implemented in various ways, such as with Least Mean Squares (LMS), Recursive Least Squares or Frequency Domain Adaptive Filter using Block LMS techniques.

Figure 2:
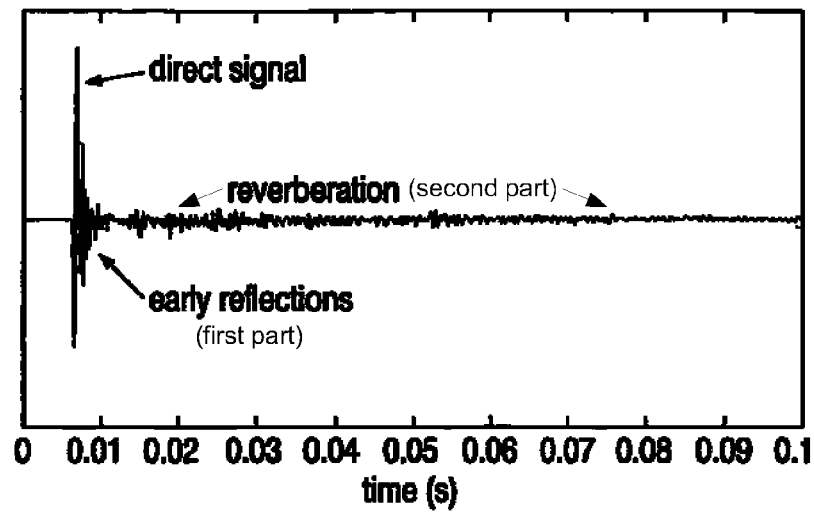
FIG. 2 shows the direct signal, the early reflections and the later arising reverberation tail of a typical room impulse response as a function of time.

The system 1 has a filter arrangement 7, which may include a beamformer 7B, which is coupled through the subtractors 5 to the echo cancelling means $g_i$ and/or to the microphone array 3. The beamformer 7B, which is included in a generally called Generalised Sidelobe Canceller, is capable of defining and controlling an audio microphone sensitivity lob or curve. Given the, in this case, two beamformer input signals on the subtractor outputs 6-1, 6-2, these signals comprise the desired audio/sound/speech signal and a reverberation signal originating from the reverberating tail (e.g., reflections in the form of reverberation (second part) as shown in FIG. 2). The beamformer 7B is capable of discriminating the reverberation signal by deriving a primary signal z including the desired signal and a reference signal x which includes the reverberation. It does this here by filtering in filters $f_1$ and $f_2$, as shown, and then summing in summing device 9-1 the filters $f_1$ outputs (i.e., the outputs of filters $f_1$ and $f_2$) to reveal the primary signal. This way the echo cancelled microphone signals $u_1$ and $u_2$ (i.e., corresponding to the outputs of microphones 3-1 and 3-2) are added such that remaining direct signals and early reflections of the desired audio are coherently summed, which increases beamformer's performance. Furthermore it does this here by filtering the echo cancelled microphone signals (6-1 and 6-2 of FIG. 1) in blocking filters $b_1$ and $b_2$ (i.e., together represented by "B" in FIG. 1) and then by summing in device 9-2 the filters' outputs to reveal a reverberation representing reference signal x. The reference signal x virtually contains no desired signal components. The filters $b_i$ (e.g., filters $b_1$ and $b_2$), together B, are called the blocking matrix. The filters $f_i$ and $b_i$ carry the directional, that is the desired sources, dependent information.

In the case as shown in FIG. 1, the beamformer 7B has one delay element 8 coupled to output 10 of summing device 9-1 followed by a summing device 9-3. The delay element 8 provides a non causal part to the beamformers' impulse response which appeared to improve its performance. The reference signal x is fed to an adaptive filter, indicated w in FIG. 1, whose output signal is fed to an inverting input 11 of summing device 9-3. The filter w of the filter arrangement 7 comprises the filter coefficients which represent or contain a measure for the reverberation (see, for example, FIG. 2, labelled (second part)) distortion in the desired audio sensed by the microphone array 3. The summing device 9-3 also has a summed or beamformer output S used to adapt the filter coefficients in the adaptive filter w of the thus adaptive filter arrangement 7, such that their coefficient values represent the varying reverberation distortion. In a non adaptive embodiment the filter coefficients would be fixed to then cancel a then presumed fixed reverberation tail.

Because the filtered reverberation or reference signal on inverting input 11 is subtracted from the primary signal in summing device 9-3 its signal on the summed output S only contains the desired signal, with the reverberating tail being cancelled.

Figure 3:
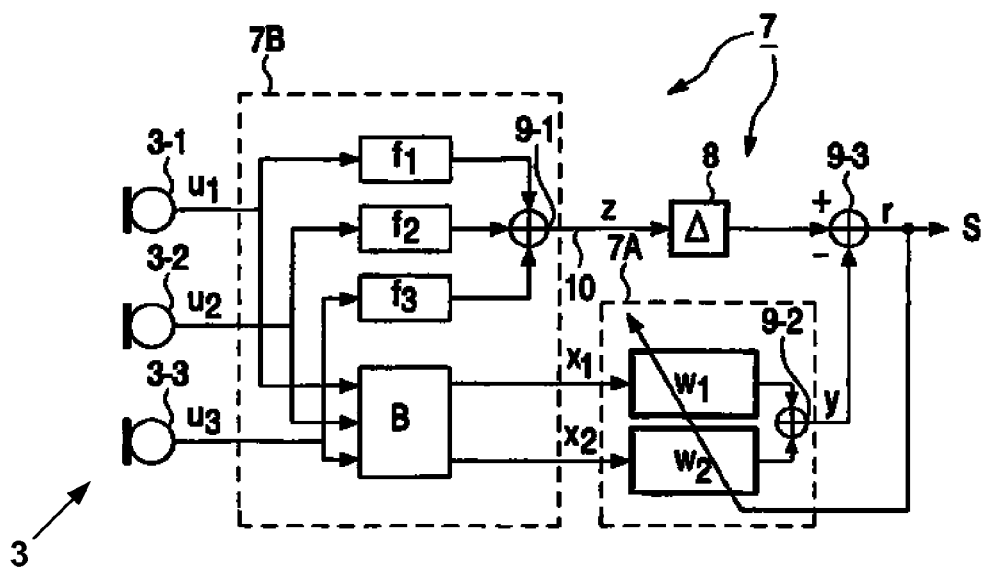
FIG. 3 shows a filter arrangement embodiment in the form of a generalised sidelobe canceller having an array of three microphones for application in an extension of the system of FIG. 1.

FIG. 3 shows an embodiment of a filter arrangement 7 having an array of three microphones 3-1, 3-2, 3-3, each microphone having an output $u_1$, $u_2$ and $u_3$, respectively. Essentially a plurality of microphones is possible. However, the above outlined principles remain the same. Block matrices may be grouped into one block B. Different reference signals $x_1$ and $x_2$ may be fed to the filter 7A, here comprising generally adaptive individualised filters $w_1$ and $w_2$. As desired, delay elements $\Delta$ may be divided up in front or after the filters $f_1$, $f_2$, and $f_3$ coupled to the respective three microphones 3. Separate delay elements $\Delta$ could be included in the respective branches from possibly each of the microphones to summing device 9-1 to account for expected individual delays between loudspeaker 2 and microphone 3.

If the system 1 does not start up by itself, due to absence of any far end signal a loudspeaker signal could be generated, e.g. a noise sequence or some kind of start up tune.

The system explained above can for example be used in hands-free communication systems, such as hands-free speakerphones, voice controlled systems for example in home or for medical applications, congress systems, dictation system or the like.

Although the above description of the figures is related to a filter arrangement 7 embodied by a beamformer 7B, it should be noted that the above also holds for any filter arrangement 7 which is aimed at suppressing audio distortion in general in the system 1 as elucidated in the above.

Reverberation is a form of distortion, whose cancellation is strongly dependent on the spatial correlation properties of the microphone array formation and the room concerned. The spatial correlation of the sound field determines the mutual correlation between the microphone signals, which in turn is the quantity which determines the design and performance of the filter arrangement 7 and beamformer 7B. These spatial correlation properties depend on several properties such as room geometry, wall absorption, position, direction and spacing of the microphones of the array 3 in a room. Advantageously the system 1 does not require some kind of model for these properties. When however these properties and/or modelled distortion echo cancelling properties or coefficients in the system 1 change significantly then substantial adaptation thereof is required, which takes a considerable amount of time. In general this time is not always available having the consequence of audible and disturbing effects during in particular shortly after presence or after absence of especially speech. The above is of primary importance in relation to spatial correlation dependent forms of distortion, such as reverberation. The remainder of this description will therefore be directed to cancellation of reverberation by means of the system having a filter arrangement as shown in FIG. 1.

The lower part of FIG. 1 shows a circuit arrangement 7' whose components are at least partly similar to (i.e., or mirrored relative to) the echo cancelling means g and the beamformer filter 7B. It comprises the beamformer 7'B which may have parts similar to beamformer 7B, and the means g' here having and $g'_1$ and $g'_2$ as echo filters, whose coefficients may be influenced or set. The respective echo filter means $g'_i$ (generally for i=1, 2, ... ) are simple filters, which normally each have fewer coefficients than the number of coefficients in the corresponding echo canceller means $g_i$, at least in the case of reverberation cancellation, because then only the reverberation tail part of the simulated impulse response has to be copied by schematically shown copying means C1, C2 and C3 from the canceller means $g_i$ into the filter means $g'_i$. Similarly the filter characteristics or coefficient values of the filters $f_1$, $f_2$, $b_1$, and $b_2$ are copied into the respective filters $f_1'$, $f_2'$, $b_1'$, and $b_2'$ of beamformer 7'B. Now an auxiliary input signal is applied on input terminal 12 of the mirrored circuit arrangement (i.e, the mirrored circuit arrangement including echo filter g' and circuit arrangement 7') such that the adaptive filter w' in circuit arrangement 7' which is coupled to output S' is capable of minimizing its output signal on output S' (i.e., wherein simulated audio distortion representative filter coefficient values are thus created by the minimizing of the output signal on output S' of adaptive filter w', the simulated audio distortion representative filter coefficient values representing correlation properties of reverberant tail parts of reverberation type audio distortion of a given sound field, and when copied to the filter arrangement, the simulated audio distortion representative filter coefficient values are for use by the filter arrangement in suppressing reverberation type audio distortion in the given sound field). The auxiliary input signal on terminal 12 may for example be a stationary white noise signal or any other signal depending on the specific type of distortion to be cancelled. The thus simulated audio distortion representative filter coefficient values of the filter w' are copied into the filter coefficients of the filter w in filter arrangement 7 (i.e., shown in the upper portion of FIG. 1). These values represent the correlation properties of the reverberant tail part(s) of the sound field and can also be used for actually filtering the desired signal in filter arrangement 7 for suppressing reverberation therein, irrespective whether desired speech is output or not. In order to adapt or update the filter 7'B beamformer coefficients, only the reverberant behaviour of the room needs to taken into account. Thereto the desired audio source is not required, as any source in the room would do that job. As long as the filter w receives its coefficients from the adaptive filter w', the filter w does not have to be adaptive.

The invention claimed is:

1. A system for suppressing audio distortion, comprising:
a circuit arrangement of:
echo cancelling means coupled between an audio output and a distorted desired audio sensing microphone array; and
a filter arrangement coupled to at least one selected from the group consisting of (a) the echo cancelling means and (b) the microphone array, the filter arrangement including filter coefficients representing at least a part of the audio distortion, the system further comprising:
an at least partly mirrored circuit arrangement having components that are at least partly mirrored relative to the (i) echo cancelling means and (ii) filter arrangement of the circuit arrangement, the at least partly mirrored circuit arrangement being configured to create and to copy simulated audio distortion representative filter coefficient values into the filter coefficients of said filter arrangement, wherein the simulated audio distortion representative filter coefficient values represent correlation properties of reverberant tail parts of reverberation type audio distortion of a given sound field, further for use by the filter arrangement in suppressing reverberation type audio distortion in the given sound field.

2. The system according to claim 1, wherein the filter arrangement includes a beamformer.

3. The system according to claim 2, wherein the beamformer comprises at least one selected from the group consisting of (i) a filter and sum beamformer and (ii) a delay and sum beamformer.

4. The system according to claim 1, wherein the at least partly mirrored circuit arrangement further comprises coefficient value copying means configured to copy coefficients between the circuit arrangement and the at least partly mirrored circuit arrangement.

5. The system according to claim 2, wherein the beamformer is arranged to be adaptive to at least one selected from the group consisting of (a) reverberation distortion and (b) desired audio signal sensed by the microphone array.

6. The system according to claim 1, wherein the at least partly mirrored circuit arrangement is further arranged for updating the simulated audio distortion representative filter coefficient values of mirrored filter coefficients.

7. The system according to claim 1, wherein each microphone of the microphone array has at least partly individualised echo cancelling means.

8. A circuit arrangement for use in the system according to claim 1.

* * * * *